United States Patent Office
3,743,508
Patented July 3, 1973

3,743,508

RADIATION SENSITIVE FILMS COMPRISING A POLYPHENYLENE OXIDE BASE

Robert F. Williams, Jr., Webster, and Edward D. Morrison, Rochester, N.Y., assignors to Eastman Kodak Company, Rochester, N.Y.

No Drawing. Continuation-in-part of application Ser. No. 34,565, May 4, 1970, which is a continuation-in-part of application Ser. No. 693,176, Dec. 26, 1967, both abandoned. This application May 24, 1971, Ser. No. 146,437
Int. Cl. G03c *1/78*
U.S. Cl. 96—87 R 13 Claims

ABSTRACT OF THE DISCLOSURE

Radiation sensitive films comprising a polyphenylene oxide base having a radiation sensitive reagent dispersed therein or formed thereon.

The polyphenylene oxide base consists essentially of a polymer of the following general formula:

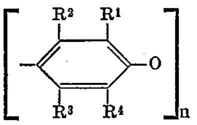

wherein $n$ is at least 100 and each $R^1$, $R^2$, $R^3$, and $R^4$ is a monovalent substituent and each $R^2$ and $R^3$ is hydrogen, $R^1$ is hydrogen or $CH_3$, and $R^4$ is hydrogen, $CH_3$ or $C_2H_5$. When $R^1$ is hydrogen, $R^4$ is hydrogen.

CROSS REFERENCE TO RELATED APPLICATIONS

This application is a continuation-in-part of U.S. patent application Ser. No. 34,565 filed May 4, 1970, and now abandoned, which application is a continuation-in-part of U.S. patent application Ser. No. 693,176 filed Dec. 26, 1967, and now abandoned.

FIELD OF THE INVENTION

The present invention relates to radiation sensitive films and more particularly to radiation sensitive films having polyphenylene oxide bases.

BACKGROUND OF THE INVENTION

Radiation sensitive films presently available for utilization in photographic, thermographic, electrographic and other radiation detection and recording processes are limited to use over relatively narrow temperature ranges of from about 25° C. to about 140° C. due to their loss of physical properties outside this range. Increases in temperature lower such essential properties as tensile strength, modulus and creep resistance, while decreases in temperature cause the film to lose toughness and flexibility.

Furthermore, present radiation sensitive film bases exhibit unfavorably high coefficients of humidity expansion which limit their use in geographical areas with extremely high humidity levels.

Attempts to avoid such limitations through the use of film bases such as polyethylene terephthalate have not been completely satisfactory or successful due to their temperature and humidity expansion limitations.

SUMMARY OF THE INVENTION

It is therefore the object of the present invention to provide a radiation sensitive film base which alleviates the above-described difficulties.

According to the present invention, there is provided a radiation sensitive film element comprising a polyphenylene oxide base having a radiation sensitive reagent dispersed therein or formed as a layer thereon.

More specifically, the invention provides a radiation sensitive film element having a polyphenylene oxide base consisting essentially of a polymer of the following general formula

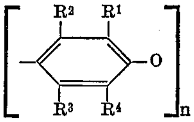

wherein $n$ is at least 100 and each $R^1$, $R^2$, $R^3$, and $R^4$ is a monovalent substituent and each $R^2$ and $R^3$ is hydrogen, $R^1$ is hydrogen or $CH_3$, and $R^4$ is hydrogen, $CH_3$ or $C_2H_5$. When $R^1$ is hydrogen, $R^4$ is hydrogen.

The radiation sensitive film element may consist of a base of a polyphenylene oxide having a radiation sensitive layer theron or, as in the preferred embodiment, of a polyphenylene oxide base, a sub or interlayer and finally a radiation sensitive layer.

Alternatively, the radiation sensitive reagent which forms the radiation sensitive layer in the above-described embodiments may be dispersed in the polyphenylene oxide base.

DETAILED DESCRIPTION OF PREFERRED EMBODIMENTS

The base composition of the present invention may be a polyphenylene oxide of the type described in British Pat. No. 990,993 and French Pat. No. 1,234,336.

The polyphenylene ethers are obtained in accordance with conventional procedures; for example, by the reaction of oxygen in the presence of an amine and a cuprous salt which is soluble in the amine and capable of existing as a cupric salt, with a phenol corresponding to the following formula:

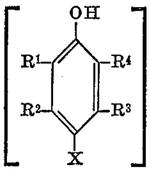

wherein X is selected from the group consisting of hydrogen, chlorine, bromine and iodine, and each $R^1$, $R^2$, $R^3$, and $R^4$ is a monovalent substituent and each $R^2$ and $R^3$ is hydrogen, $R^1$ is hydrogen or $CH_3$ and $R^4$ is hydrogen, $CH_3$ or $C_2H_5$. When $R^1$ is hydrogen, $R^4$ is hydrogen.

The ethers described above possess very interesting properties, notably a high thermal stability and a high resistance to stretching. The polymer derived from 2,6-dimethylphenol is particularly interesting as is that derived from 2-methyl-6-ethylphenol. These two polymers from the preferred film bases of the present invention.

As stated above, the ethers formed from the 2,6-dimethylphenol and 2-methyl-6-ethylphenol exhibit outstanding thermal stability (they are stable from about −70° F. to about 300° F.). They also exhibit a reduced coefficient of humidity expansion of $0.4\times10^{-5}$ in./in./° F. or less as compared to a coefficient of humidity expansion of $0.8\times10^{-5}$ in./in./° F. which is exhibited by polyethylene terephthalate, the most popular base in radiation sensitive and particularly photographic film elements of present use. Hence, these two ethers or oxides of polyphenylene are particularly preferred as the base of the radiation sensitive film element of the present invention.

The base film may for some purposes be formed by conventional solvent coating or extruding processes. As cast or extruded, the properties of the films are acceptable for some applications. Applications requiring properties other than those of the "as cast" or extruded films can frequently be satisfied by uniaxial or biaxial orientation of the films. Films can be oriented by conventional methods such as tentering and drafting, compression rolling, and tentering plus compression rolling. Heat distortion properties of oriented films are frequently improved by annealing the oriented film. Other treatments, as described in greater detail below, can be used to further improve film properties.

The films, as already mentioned, can be formed by solvent casting or extruding. These polymers, however, resist most solvents, hence, only a very specific system may generally be used. Solutions of up to 30% solids can be achieved using substantially pure chloroform as solvent. Such solutions can be cast using conventional solvent casting techniques, however, as explained below, further treatment and precautions are generally necessary to provide solvent cast films which perform in a superior fashion in photographic applications subject to demanding conditions of temperature and humidity.

Films suitable to the application under consideration here are readily formed by extrusion of the polymeric material. Extrusion can be carried out using conventional techniques at a temperature of from about 290 to about 375° C. The most perfect films can be produced with the greatest handling ease at temperatures of from about 320 to about 350° C.

In order to obtain solid, flexible films, the molecular weight of the polymer must be relatively high. The degree of polymerization of the polyphenylene oxide base should therefore be at least 100 and preferably between 150 and 600. The preferred polymer of 2,6-dimethylphenol may reach a degree of polymerization of 1000 while remaining soluble in chloroform and capable of forming satisfactory films. Material having a number average molecular weight of from about 25,000 to about 35,000 produces a film having the proper balance of clarity, stiffness and modulus.

Higher molecular weight resins evaluated to determine the effect of elevated molecular weight have improved extrudability and less color, and improved clarity, a property which may be desirable although not required in certain usages. Extruded or solvent cast films (from 25% chloroform solution) of resins having a minimum degree of polymerization on the order of about 200 and therefore a number average molecular weight in the range of about 25,000 to about 30,000 are found to be eminently acceptable for photographic film with some small exceptions in the area of dimensional stability, the coefficient of humidity expansion being on the order of $0.8\times10^{-5}$ in./in./° F. which is, in some applications, too high for graphic arts and similar photographic products requiring constant dimensions over a broad range of humidities and temperatures. Analysis has demonstrated that films exhibiting such relatively less than optimum properties generally contain about 6% residual chloroform when cast from a solution of this solvent. Heating of such films at 250° F. for about six hours reduces this residual solvent content to about 1.2% yielding a film having a coefficient of humidity expansion of $0.2\times10^{-5}$ in./in./° F. which is acceptable for all photographic applications. Heating for shorter amounts of time, for example about 2–3 hours at this temperature to reduce the residual solvent content to below about 3%, has now been found to produce useful materials. Longer heating can reduce residual solvent content to a highly desirable level below about 1% (periods up to about 10 hours).

In manufacturing solvent cast films from a chloroform solution, it has further been found necessary to evaporate the solvent from the film after casting under very carefully controlled conditions, which include evaporation in a chloroform atmosphere at a temperature between about 18 and 26° C., the chloroform being under relatively normal vapor pressure. Films formed in a process wherein solvent evaporation is performed in an atmosphere other than chloroform with relatively rapid evaporation, exhibit poor physical properties such as a high degree of brittleness which makes them unsuitable for film applications. After reduction of the residual solvent content of the film to about 6% as described above, the final heating to reduce residual solvent levels to below about 3%, as preferred, may be carried out under normal solvent evaporation conditions.

Commercially available polyphenylene oxide resin sold by General Electric under the trade name "PPO—Grade C–1001" (I.V. 0.64 in chloroform) was originally evaluated. This material and film made therefrom is tan in color and completely opaque even at a thickness of 1 mil. It was found that this material can be extruded using high temperatures (330° C.), but produces a film which is grainy and opaque making it relatively unacceptable for photographic film. However, other mechanical properties were in the range necessary for photographic use and this material was unusual in that it retained these improved properties even at 140° C., thus making it useful as a support layer for photographic emulsions not necessarily used as what is commonly referred to as "film" but rather as photographic paper for receiving an image projected through a negative.

In the accompanying Table I, we have compared the physical properties of polyphenylene oxide films of the above high number average molecular weight and low residual solvent content with those of poly(ethylene terephthalate) materials at room temperature and 140° C.

TABLE I.—FILM PROPERTIES OF PHENYLENE OXIDE POLYMERS COMPARED TO POLYETHYLENE TEREPHTHALATE

| Test temp., ° C. | Film | Modulus, $10^5$ p.s.i. | Tensile, p.s.i. | Elongation, percent |
|---|---|---|---|---|
| 24 | Polyphenylene oxide | 3.0 | 9,900 | 105 |
| | Polyethylene terephthalate. | 6.5 | 14,400 | 34 |
| 140 | Polyphenylene oxide | 2.2 | 4,600 | 172 |
| | Polyethylene terephthalate. | 1.0 | 4,500 | 20 |

While the phenylene oxide type polymers show some loss in properties at 140° C., the polyester film shows a drastic reduction in properties, and modulus (stiffness) is so low that it would be unacceptable for use at 140° C.

Attempts to eliminate coloration by dissolution revealed the aforementioned discovery that only chloroform demonstrated definite promise as a solvent. However, when the polymer contains stabilizing additives and processing aids which cause opacity, even chloroform which dissolves the bulk of the polymer leaves a large amount of insoluble pigment which makes films cast from solutions of the polymer in chloroform generally unacceptable for photographic purposes.

The opaqueness of polyphenylene oxide films is apparently due to a variety of conditions. Experimentation indicates that the primary cause of opacity is the presence of various additives in commercial materials which are introduced as processing aids to allow fabricaion of extruded sheet or molded parts at lower temperatures and to inhibit thermal and oxidative degradation. For example, because of the high melting point of the base resin, film formation by extrusion tends to cause thermal decomposition and concomitant discoloration of polyphenylene oxide films. Many of the aforementioned additives are apparently incorporated to minimize this deteriorating effect by reducing melt viscosity to permit extrusion at lower temperatures.

Commercially available polyphenylene oxide (i.e., relatively low number average molecular weight material) containing none of the aforementioned additives and having an I.V. of 0.6 in chloroform has been extruded, however, degradation occurs and films of this material solvent cast from chloroform are too brittle for broad use as photographic film base films. Hence, a material suitable for photographic film base applications should be free from any such stabilizing additives which tend to render the material opaque; however, it may include plasticizers, etc. of the types disclosed hereinafter.

It should also be noted, that as the length or size of the phenyl ring substituent chains increase, the melting point of the final film base decreases. Thus, although the polymers of the 2,6-dimethylphenol and the 2-methyl-6-ethylphenol are preferred, since they are sufficiently soluble to be easily formed into films, and subsequently spliced with such solvents as methylene chloride, chloroform or other chlorinated solvents, ideal films can be formed of the polymer of plain phenol formed as described above. Furthermore, extensive lengthening of the substituent chain should be avoided as this lowers the melting point and heat resistance of the film to a point where its properties offer no substantial benefit over base films presently in use. Aliphatic chains of over five carbons produce such undesirable results.

As should be clear, any number of materials may be added to the polymer to improve or modify certain characteristics thereof, so long as the added materials do not adversely affect the properties of the film which make its use as a film base beneficial. Among such materials which may be added are plasticizers such as butyl stearate, dioctyl phthalate, dibutyl sebacate and other conventional plasticizers. The addition of such plasticizers and in particular the butyl stearates when the film base material is extruded not only serves to lubricate and hence improve the ease with which extrusion is performed, but also provides a much clearer and transparent product than is obtained when such plasticizers are not incorporated into the polyphenylene oxide film base compositions. Such plasticizers are preferably added at concentrations of from about 1 to about 15 percent by weight of the polyphenylene oxide being extruded. Dyes and fillers such as carbon black may also be added without substantially adversely affecting the basic properties of the film assuming the varying degrees of opacity which they may impart are acceptable for the particular base application. Such additives should not generally comprise more than about 20 percent of the polyphenyle oxide base although they may be incorporated in increasing amounts until the film base loses a substantial amount of its beneficial properties.

The thicknesses of the polyphenylene oxide film bases which are useful in the present invention range from 0.25 to 20 mils depending upon the strength required in the particular application. Since the film must be self-supporting as a film base, a minimum thickness of 0.25 mil is required to insure against unnecessary breakage. A maximum thickness can be established only by reference to the final application in which the film is to be used. To insure the flexibility that is required in most applications of radiation-sensitive films a maximum thickness of 20 mils, as set out above, should be observed; however, where flexibility is of no importance, semiflexible or rigid sheets of the present film base may be utilized and these have an almost indefinite thickness range.

The radiation sensitive reagents which provide the functionality of the radiation sensitive films may be formed as a layer on the polyphenylene oxide polymer film base or alternatively they may be dispersed therein.

In the case where the radiation sensitive reagents form a layer upon the polyphenylene oxide base, the radiation-sensitive layer may be of a number of different types. In the preferred embodiment, the radiation sensitive layers consist of light sensitive layers such as those formed from gelatino-silver halide emulsions. It should be clear to those skilled in the art, however, that any other radiation sensitive layer may also be applied in a similar manner in order to provide a photographic film element.

Similarly, a thermosensitive layer may be applied to the polyphenylene oxide base. Such layers normally consist of a crystalline polymer such as polyvinyl acetate which polymer becomes amorphous at a precisely determined and specified temperature.

The radiation sensitive layer may also consist of an electrographic layer which detects ionizing radiation.

When the radiation sensitive reagents are applied as a layer to the surface of the polyphenylene oxide film base, it is often desirable to "prep" the film base surface with some type of sub which insures improved adhesion between the film base of the present invention and the radiation sensitive layer to be applied thereon.

Several such subs or subbing compositions are well known to those skilled in the related arts, particularly the photographic arts.

Among the subs which have been found to be useful with the present polypenylene oxide film bases are the well-known terpolymer subs such as that composed of methyl acrylate, vinylidene chloride and itaconic acid, polymer subs such as that obtained by reacting low molecular weight polyethylene with maleic anhydride, and in particular chlorinated polyethylene and other chlorosubstituted adhesives which provide a superior degree of attack on film bases of the materials of the present invention, and hence improved adhesion of the radiation sensitive layer to the film base.

It should also be readily realized that other layers may also be added to the radiation sensitive films of the present invention, i.e., backers, antistatic layers, barrier layers, etc. may be added to the composite film element of the invention to provide the characteristics of properties needed in the finished film element.

As stated above, the radiation sensitive reagents need not form a layer upon the surface of the polyphenylene oxide film but may actually be dispersed therein. Although such techniques are extremely new to the arts to which this invention pertains, we wish to indicate the adaptability of this film base to such applications as the Kalvar process which disperses a vapor releasing reagent in the film base which reagent upon exposure to light releases the vapor forming bubbles which produce a transparency.

The following examples further illustrate the invention:

EXAMPLE 1

A phenylene oxide type polymer formed by the polymerization of 2,6-dimethylphenol and commercially available from the General Electric Company as PPO Grade C–1001 is heated to 325° C. to soften and then extruded as a 10.5 mil film from a 1½" Modern plastic extruder into a 60° F. water bath. The "as extruded" film is coated with a terpolymer emulsion composed of 83.3 percent vinylidene chloride, 14.7 percent methyl acrylate and 2.0 percent itaconic acid. After the coating is cured at 80° F., the coated surface of the polyphenylene oxide film base is overcoated with a conventional photographic gelatino-silver halide emulsion. The gelatino-silver halide emulsion is dried and the tensile properties of the composite film at room temperature are determined to be as follows:

| | Along | Across |
|---|---|---|
| Tensile strength, p.s.i. | 11,500 | 8,300 |
| Young's modulus, p.s.i. | 300,000 | 290,000 |
| Elongation, percent | 150 | 61 |

At 250° F. the tensile properties of the sample of the film are determined to be:

| | Along | Across |
|---|---|---|
| Tensile, p.s.i. | 5,400 | 3,700 |
| Young's modulus, p.s.i. | 210,000 | 220,000 |
| Elongation, percent | 260 | 84 |

When the composite film sample is packed in Dry Ice for twenty-four hours, the film remains flexible and tough. Although the physical properties of this film are good, the base is grainy and quite opaque.

EXAMPLE 2

A sample of the extruded film from Example 1 is compression rolled to 5.0 mils. The tensile properties of the compression rolled polyphenylene oxide film base are:

| | Along | Across |
|---|---|---|
| Tensile, p.s.i. | 24,300 | 8,800 |
| Young's modulus, p.s.i. | 520,000 | 340,000 |
| Elongation, percent | 47.5 | 150 |

EXAMPLE 3

A sample of the polyphenylene oxide film base from Example 1 is tentered in the width direction to 7.0 mils, then compression rolled lengthwise to 5.0 mils. Tensile properties of the tentered and compression rolled film are:

| | Along | Across |
|---|---|---|
| Tensile, p.s.i. | 16,000 | 14,500 |
| Young's modulus, p.s.i. | $4.6\times10^5$ | $4.1\times10^5$ |
| Elongation, percent | 62 | 81 |

EXAMPLE 4

A phenylene oxide type polymer chemically similar to the material described in Example 1, however, free of any processing aids or stabilizing additives, and having a number average molecular weight of 30,000 was dissolved in chloroform at 23° C. (solid:solvent ratio was 1:3). Using a coating knife this solution was coated onto a glass plate and cured at room temperature in a chloroform atmosphere. After evaporation of the solvent, the film was removed from the plate. Final thickness was about 3 mils. Residual chloroform was 5.8 percent. Coefficient of humidity expansion was $0.8\times10^{-5}$ in./in./° F. The film was then cured for seven hours at 250° F. Residual solvent was reduced to 0.61 percent and coffiecient of humidity expansion was $0.1\times10^{-5}$ in./in./° F., thus meeting requirements for photographic products requiring exceptional dimensional stability. A subbing and photosensitive emulsion layer of the type described in Example 1 is applied over the clear film resulting from the casting procedure. The resulting photosensitive film has the following physical properties:

| | Along | Across |
|---|---|---|
| Tensile, p.s.i. | 9,800 | 9,900 |
| Young's modulus, p.s.i. | $3.4\times10^5$ | $3.5\times10^5$ |
| Elongation, percent | 102 | 18 |

EXAMPLE 5

One hundred grams of polyphenylene oxide type polymer formed by the polymerization of 2-methyl-6-ethylphenol free of stabilizing additives and having a number average molecular weight of 28,000 are dissolved in 250 grams of chloroform and a film cast as described in Example 4. Subbing and coating with the gelatino-silver halide photosensitive layer of Example 1 produces a clear photographic film.

The invention has been described in detail with particular reference to a preferred embodiment thereof, but it will be understood that variations and modifications can be effected within the spirit and scope of the invention as described hereinabove and as defined in the appended claims.

We claim:

1. A radiation-sensitive film element comprising a solvent cast polyphenylene oxide film base and a radiation-sensitive reagent, said polyphenylene oxide having a number average molecular weight between about 20,000 and about 35,000, containing not more than about 6 percent by weight residual solvent and having the following empirical formula:

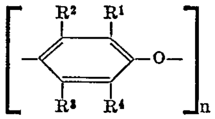

wherein each $R^2$ and $R^3$ is hydrogen, $R^1$ is hydrogen or $CH_3$, $R^4$ is hydrogen, $CH_3$ or $C_2H_5$, when $R^1$ is hydrogen, $R^4$ is hydrogen, and $n$ is at least about 100.

2. A radiation sensitive film element in accordance with claim 1 wherein said radiation-sensitive reagent forms a radiation sensitive layer upon said polyphenylene oxide film base.

3. The radiation sensitive film of claim 2 wherein said radiation-sensitive reagent consists of a light-sensitive layer.

4. The radiation sensitive film of claim 3 wherein said light-sensitive layer consists essentially of a gelation-silver halide emulsion.

5. The radiation-sensitive film of claim 4 wherein said radiation sensitive film includes a sub layer between said polyphenylene oxide base and said light-sensitive layer.

6. The radiation-sensitive film of claim 5 wherein said sub layer comprises a terpolymer of 83.3 percent vinylidene chloride, 14.7 percent methyl acrylate and 2.0 percent itaconic acid.

7. The radiation-sensitive film element of claim 3 wherein said polyphenylene oxide base ranges in thickness from about 0.25 mil to about 20 mils.

8. The radiation-sensitive film element of claim 3 wherein said polyphenylene oxide film base includes a plasticizer.

9. The radiation-sensitive film element of claim 8 wherein said plasticizer is present at a concentration of from about 1 to about 15 percent by weight.

10. The radiation-sensitive film element of claim 9 wherein said plasticizer is selected from the group consisting of butyl stearate, dioctyl phthalate, and dibutyl sebacate.

11. A radiation-sensitive film element in accordance with claim 1 wherein said radiation-sensitive reagent is a vapor-releasing reagent which is dispersed in said polyphenylene oxide film base.

12. The radiation-sensitive film element in accordance with claim 1 wherein $R^1$ and $R^4$ are $CH_3$.

13. The radiation-sensitive film element in accordance with claim 1 wherein $R^1$ is $CH_3$, $R^4$ is $C_2H_5$.

References Cited

UNITED STATES PATENTS

| | | | |
|---|---|---|---|
| 3,306,874 | 2/1967 | Hay | 260—47 |
| 3,306,875 | 2/1967 | Hay | 260—47 |
| 3,373,226 | 3/1968 | Gowan | 260—47 X |
| 3,378,505 | 4/1968 | Hay | 260—47 X |
| 3,383,435 | 5/1968 | Cizek | 260—47 X |
| 3,432,469 | 3/1969 | Hay | 260—47 |
| 2,943,937 | 7/1960 | Nadeau et al. | 96—87 |
| 3,547,645 | 12/1970 | Buchwald et al. | 96—87 |
| 2,627,088 | 2/1953 | Alles et al. | 96—84 X |

RONALD H. SMITH, Primary Examiner

U.S. Cl. X.R.

96—48 HD, 49, 114